United States Patent [19]

Allegrezza, Jr. et al.

[11] Patent Number: 5,158,721
[45] Date of Patent: Oct. 27, 1992

[54] POROUS MEMBRANE FORMED FROM INTERPENETRATING POLYMER NETWORK HAVING HYDROPHILIC SURFACE

[75] Inventors: Anthony E. Allegrezza, Jr., Milford; Ellen C. Bellantoni, Framingham, both of Mass.

[73] Assignee: Millipore Corporation, Bedford, Mass.

[21] Appl. No.: 755,968

[22] Filed: Sep. 6, 1991

Related U.S. Application Data

[62] Division of Ser. No. 444,086, Nov. 30, 1989, Pat. No. 5,079,272.

[51] Int. Cl.$^5$ .................. B29C 35/08; C08J 3/28; B01D 39/14
[52] U.S. Cl. .................................. 264/22; 264/41; 522/120; 428/315.7; 521/50.5; 521/64; 521/134; 525/903; 210/500.27; 210/500.35; 210/500.42
[58] Field of Search .............. 428/315.7, 315.7; 521/134, 53, 64; 264/41, 22; 522/120; 525/903; 210/500.27, 500.35, 500.42

[56] References Cited

U.S. PATENT DOCUMENTS

| | | | |
|---|---|---|---|
| 4,618,533 | 10/1986 | Steuck | 428/315.7 |
| 4,845,132 | 7/1989 | Masuoka et al. | 521/53 |
| 5,013,339 | 5/1991 | Mahoney et al. | 264/41 |
| 5,079,272 | 1/1992 | Allegrezza et al. | 521/64 |

Primary Examiner—John Kight, III
Assistant Examiner—John M. Cooney, Jr.
Attorney, Agent, or Firm—Paul J. Cook; Andrew T. Karnakis

[57] ABSTRACT

A porous membrane is formed from an interpenetrating polymer network of a hydrophobic polymer and a polymerized and crosslinked hydrophilic monomeric composition. A solution of the polymer and monomeric composition is cast, exposed to ultraviolet radiation, coagulated and dried. The resulting dried membrane is annealed in order to render its surface hydrophilic.

7 Claims, 1 Drawing Sheet

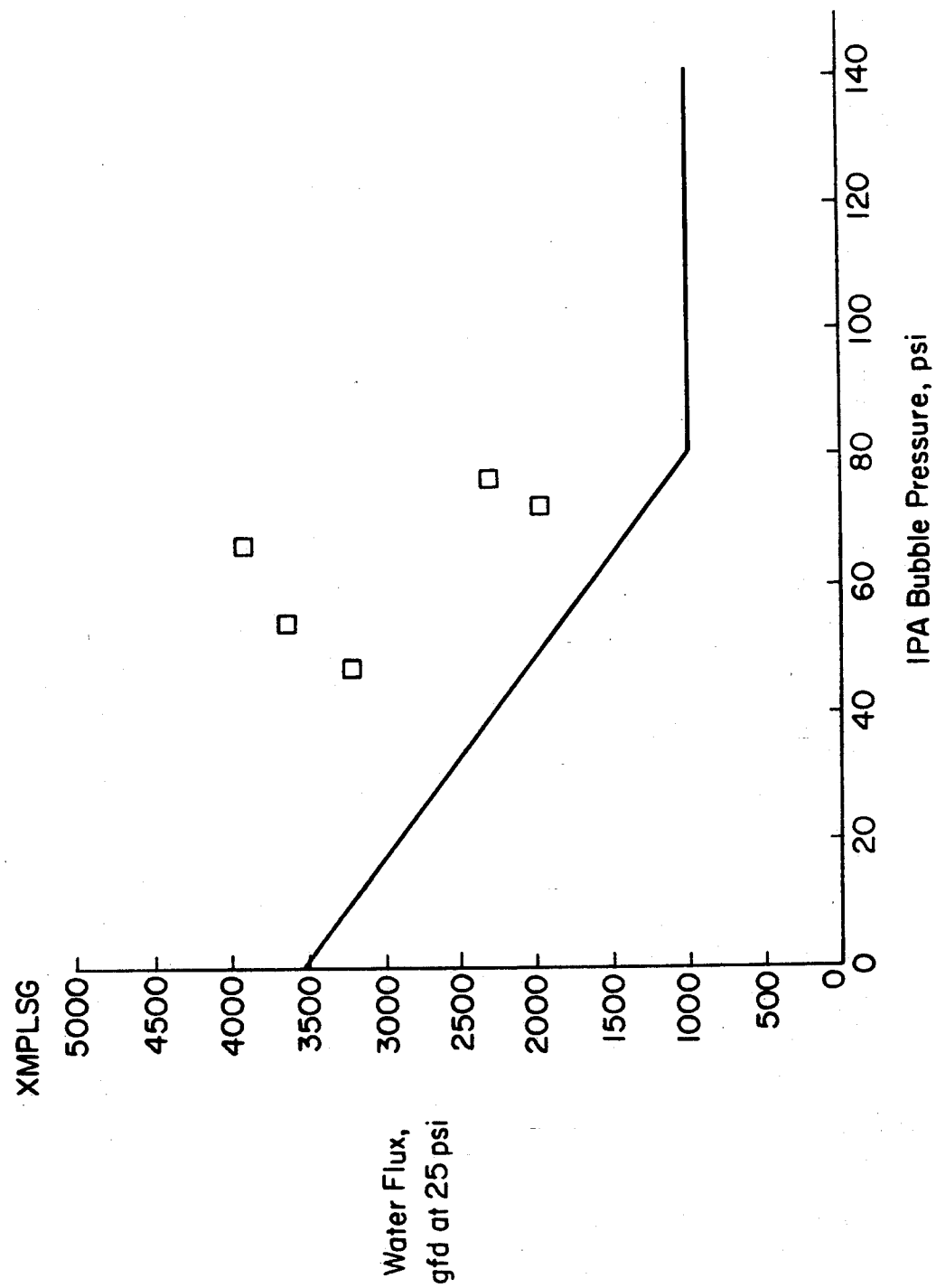

POROUS MEMBRANE FORMED FROM INTERPENETRATING POLYMER NETWORK HAVING HYDROPHILIC SURFACE

This is a divisional of copending application Ser. No. 444,086 filed on Nov. 30, 1989, now U.S. Pat. No. 5,079,272.

BACKGROUND OF THE INVENTION

This invention relates to a microporous or ultrafiltration membrane having a hydrophilic surface and formed from an interpenetrating network of a hydrophobic polymer and a hydrophilic cross linked monomeric composition and to the process for forming the membrane.

In many applications of filtration technology, it is desirable to utilize a membrane filter which is mechanically strong, is thermally stable, is relatively inert chemically and is insoluble in most organic solvents. Often, it is desirable that the membrane has surface properties which are radically different from, and sometimes incompatible with, the bulk properties of the membrane. Desirable surface properties include wettability, low protein adsorbing tendency, thromboresistivity, controlled ion exchange capacity and controlled surface chemical reactivity.

Conventional methodology presently used to achieve the duality of function of bulk properties which differ from the surface properties is to coat a preformed membrane having the desired bulk properties with an oligomer or polymer having the desired surface properties. Typical coating materials include surfactants and water soluble polymers such as polyvinylpyrrolidone. This approach has disadvantages, particularly because the coating reduces flux by reducing pore size; flux reduction is especially severe for small (<0.1 u) pore membranes.

It also has been proposed to utilize graft polymerization techniques to modify the surface characteristics of a polymeric substrate. Typical examples of graft polymerization are shown for example in U.S. Pat. Nos. 3,253,057; 4,151,225; 4,278,777 and 4,311,573. It is difficult to utilize presently available graft polymerization techniques to modify the surface properties of the porous membrane. This is because it is difficult to modify the entire surface of the membrane including the surfaces within the pores while avoiding significant pore blockage and while retaining membrane porosity.

It has been proposed in U.S. Pat. No. 4,618,533 to form a porous membrane having a porous membrane substrate to which is directly coated a cross-linked polymer formed from a monomer polymerized with a free radical initiator in situ on the substrate. The resulting composite membrane has essentially the same porous configuration as the porous substrate. It is disclosed that the presence of a polymerization initiator and a cross-linking agent are necessary in order to effect the desired polymerization and cross-linking in situ and thereby to obtain the desired porous configuration of the membrane product, i.e., little or no blockage of the pores, because the pores are large.

U.S. Pat. No. 4,787,976 discloses a permeable membrane that does not adsorb protein and is formed from a solution of a hydrophilic urethane prepolymer and a soluble polymer cast on a substrate. The cast film then is immersed in a coagulation bath such as an aqueous bath which effects polymerization of the prepolymer as well as the formation of pores in the film.

U.S. Pat. No. 4,119,581 discloses a method for producing an ion-exchange non-porous membrane from a solution of a thermoplastic polymer and monomers which, when exposed to heat or gamma radiation, become polymerized to form an interpenetrating network of polymer chains. The monomers used to form the ion exchange capacity of the membrane are a diamine and a dihalide. They undergo the Menshutkin reaction to produce inherently ionic polymers.

U.S. Pat. No. 4,302,334 discloses a process for making a microporous membrane from a casting solution of a hydrophobic polyvinylidene fluoride and a vinyl acetate polymer. The resulting interpenetrating polymer network is cast on a substrate in the usual way and coagulated to form a porous membrane. The polyvinyl acetate is then hydrolyzed to polyvinyl alcohol, a hydrophilic polymer.

U.S. Pat. No. 4,012,324 discloses a method for making porous membranes from a solution of a method for making matrix polymeric mixture and a cross-linking agent, e.g., an epoxy. Cross-linking is effected by heating.

The prior art discloses a variety of ways to produce porous hydrophilic membranes from materials that are primarily hydrophobic. None discuss a two step process for producing hydrophilic porous membranes by polymerizing a hydrophilic monomer in a solution of a hydrophobic polymer, subsequently casting a membrane from the solution; and then annealing to produce a hydrophilic membrane.

SUMMARY OF THE INVENTION

The present invention provides a water wettable porous membrane formed of an interpenetrating network of a hydrophobic polymer and a crosslinked hydrophilic polymer which is formed from a polymerized hydrophilic monomer. The membrane is formed from a solution of the hydrophobic polymer, a monomeric composition which is a precursor to the hydrophilic polymer, a cross-linking agent for the monomeric composition and a photoinitiator. The solution is cast on a substrate and is exposed to ultraviolet radiation in order to polymerize and cross-link the monomeric composition and to form an interpenetrating polymeric network. The resultant polymeric solution is coagulated. During coagulation, pores are formed in the membrane and most of the solvent is removed. The remaining solvent is washed out of the membrane in a subsequent washing step. The membrane is then annealed. Upon annealing, the surface of the membrane suprisingly becomes hydrophilic. The membranes of this invention can be used without prewetting in filtration processes which process aqueous solutions, such as in the pharmaceutical industry or the electronics industry.

DESCRIPTION OF THE SPECIFIC EMBODIMENTS

The present invention provides a porous membrane having a hydrophilic surface and novel morphology. The membrane is formed from an interpenetrating network of a hydrophobic polymer and a hydrophilic polymer produced by polymerizing and crosslinking a hydrophilic monomer. The surface of the membrane including the ports surface is formed from a mixture of hydrophobic and hydrophilic polymers which renders the overall membrane surface hydrophilic. The hydrophilic polymers is rendered crystalline and the surface is rendered hydrophilic as a result of the annealing step described below. In one aspect of this invention a membrane having a hydrophilic surface and an average pore size within the range of about 0.01 to 0.1 microns is provided.

The hydrophobic polymers useful in the present invention are those which are rendered crystalline under the annealing conditions set forth below. Suitable hydrophobic polymers include fluorinated polymers such as polyvinylidene fluoride or the like.

In accordance with this invention, there is provided a porous membrane formed of an interpenetrating polymeric network having the desired bulk properties and a hydrophilic surface. The interpenetrating network of the hydrophobic polymer and hydrophilic polymer is formed from a solution of the hydrophobic polymer, a monomeric composition precursor of the hydrophilic polymer, a cross-linking agent for the monomeric composition and a photoinitiator. The solution is cast onto an appropriate substrate, after which the monomeric composition is polymerized and cross-linked in the cast film by exposure to ultraviolet radiation. The irradiated film then is coagulated to a porous membrane during coagulation, most of the solvent leaves the membrane; the rest is washed out afterward. The porous membrane is then annealed to make it hydrophilic.

Many monomeric compositions can be utilized herein as long as it is capable of being polymerized by free radical polymerization and can be cross-linked to form a hydrophilic surface on the membrane product. Representative suitable polymerizable monomers include hydroxylalkyl acrylates or methacrylates including 1-hydroxyprop-2-yl acrylate and 2-hydroxyprop-1-yl acrylate, hydroxypropyl methacrylate, 2,3-dihydroxypropyl acrylate, hydroxyethylacryate, hydroxyethylacrylate, hydroxyethyl methacrylate, N-vinyl pyrollidone or the like or mixtures thereof.

The particular solvent employed for the hydrophobic polymer and the monomeric composition will depend upon the particular monomeric composition employed and upon the particular hydrophobic polymer utilized to form the porous membrane. All that is necessary is that the monomer the crosslinker, the initiator, the hydrophobic polymer and the interpenetrating network dissolve in the solvent. Representative suitable solvents include dimethylacetamide (DMAC) or N-methylpyrollidone (NMP). Generally the polymerizable monomer is present in the solution at a concentration between about 3 and about 15%, preferably between 5 and 10% based upon the weight of the solution. The hydrophobic polymer is present in the solution at a concentration between about 10 and about 20%, preferably between about 12 and about 18%, based upon the weight of the solution. The hydrophobic polymer provides mechanical strength to the membranes while the hydrophilic polymer provides desirable surface characteristics to a membrane such as protein rejection. If too little hydrophilic polymer is utilized, membrane wettability is undesirably reduced. Excessive hydrophilic polymer results in undesirable gelling and polymer separation. Thus, increased amounts of hydrophilic monomer cannot be utilized as a means to improve the wettability of the membrane surface.

Suitable initiators and cross-linking agents for the monomers set forth above are well-known in the art. For example, when utilizing acrylates as the polymerizable monomer, suitable polymerizable initiators include benzoin ethers such as isopropyl benzoin ether and butyl benzoin ether; benzophenones such as benzophenone and Michler's ketone and acetophenones such as 2-hydroxy-2-methyl phenyl propanone, $\alpha$, $\alpha$dimethoxy-$\alpha$-phenyl acetophenone and $\alpha$,- $\alpha$-, dimethoxy $\alpha$-hydroxy acetophenone or the like. When utilizing acrylates or methacrylates as the polymerizable monomer, suitable cross-linking agents include difunctional acrylates, or methacrylates such as tetraethylene, glycol diacrylate or dimethacrylate. The cross-linking agent generally is present in an amount of between about 5% and about 30% by weight, preferably between about 6% and about 25% by weight based on the weight of the polymerizable monomer. Greater amounts of cross-linking agent can be used but no significant advantage is gained thereby. The polymerization initiator is present in an amount between 2% and 8% by weight, preferably between 3% and 5% by weight based upon the weight of the polymerizable monomer.

After the solution of hydrophobic polymer and monomeric composition is formed, it is cast on a substrate such as glass, polyester or nonwoven fabric or the like to form a film of a thickness generally between 5 and about 15 microns. The film is exposed to ultraviolet radiation of low intensity so as to avoid excessive reaction rates which produce non-uniform polymerization. Typical radiation intensities are between about 0.2 and about 2 mw/cm$^2$ at a wave length between about 350 and about 400 nm for a period of between about 10 and about 120 seconds in order to initiate free radical polymerization and cross-linking of the monomeric composition thereby to effect formation of an interpenetrating polymeric network in solution. The cast film of interpenetrating polymeric network solution is coagulated by putting it into a liquid in which the network is insoluble and with which the solvent is miscible, such as water, alcohols, alcohol-water mixtures, or aceton-water mixtures. Process form in the membrane during coagulation.

Surprisingly, it has been found that the last step of the process of this invention, i.e., the annealing step, causes the membrane to become easily wettable. That is, the annealed membrane is entirely wettable with an aqueous solution with a time period of less than about 1 minute. Annealing is conducted at a temperature between about 130° C. and 150° C. for a time between about 20 minutes and 60 minutes. Preferably annealing is conducted while the membrane is restrained to prevent shrinkage. As a result of annealing, the hydrophobic polymer becomes more crystalline. The hyrophilic polymer is excluded from either of these crystalline regions. It covers them and renders the material surface hydrophilic. The hydrophobic polymer is referred to herein as "semi-crystalline". By the term "semi crystalline" as used herein is meant polymeric solids intermediate between true crystals and amorphous structures. Typically they give X-ray patterns with several maxima, with lines sharper than those of liquids.

The membranes of this invention can have a very small maximum pore size of between about 0.01 to 0.1 microns. Generally, membranes having a pore size this small suffer from serious flux reductions since the ratio of the decreased flux observed between a small pore membrane and a large pore membrane is proportional to the fourth power of the pore size ratio. These small pre membranes of this invention have a flux of at least about 1000 gal/ft/day at 25 psi. Despite these very small maximum pore sizes, these membranes have excellent flux characteristics. These very small maximum pore size membranes have isopropyl alcohol bubble pressures or points as defined herein of between about 40 pounds per square inch (psi) and about 140 psi. Water flux of these membranes in above about 3500 gallons per foot per day at 25 psi (gfd at 25 psi) for these membranes whose bubble point is about 40 psi, decreasing to above about 1000 gfd at 25 psi for membranes whose bubble point is about 80 psi, and also above about 1000 gfd at 25 psi for membranes whose bubble point is about 140 psi as shown in the figure.

The following examples illustrate the present invention and are not intended to limit the same.

EXAMPLE I

A solution was formed from 5 grams of hydroxypropylacrylate monomer, 1.3 grams of tetraethyleneglycoldiacrylate, 4 grams of a photoinitiator comprising Darocure 1173 ($\alpha$, $\alpha$-dimethoxy-$\alpha$-hydroxy acetophenone) available from E. Merck Corporation which were added to 89.7 grams of a 14 weight % solution of poly(vinylidine fluoride) and 5 weight % lithium chloride (LiCl) in dimethylacetamide (DMAc). The solution was cast in a film approximately 10 mils thick on a glass plate and thereafter exposed to ultraviolet radiation wavelength of maximum emission of 365 nm at an intensity of between about 0.2 and 0.6 mm/cm$^2$ for 80 seconds. The resultant cast film was coagulated into a membrane by placing it in a mixture of 1 volume acetone and 3 volumes water. This membrane was annealed at 130° C. for 30 min under restraint. After annealing, its flux was 1970 gal/ft$^2$/day at 25 psi and its bubble point was 72 psi. It contained 3.5% by weight poly(hydroxypropyl acrylate-co-tetraethylene glycol diacrylate). The membrane wet completely is less than 30 seconds and retained 90% of 0.07u beads when an aqueous suspension of these beads was filtered through it.

The flux of the membranes was measured using ultrafiltration cells, graduate cylinders, and stopwatches. 43 mm diameter disks were cut rom the membranes, wet with water, and positioned in the cells. The cells were filled with water and pressurized to 25 pounds per square inch (psi) to drive the water across the membrane. A stopwatch was started as the pressure was applied. A reasonable volume of water, typically 10-30 ml, was collected; the volume in milliliters and the time to collect it, in minutes, were recorded. Milliliters per minute per square centimeter of membrane was converted to gallons per foot$^2$ per day (gfd).

The bubble point of the membrane is measured from the pressure required to displace isopropyl alcohol (IPA) from from an IPA-wet membrane. A fluid-wet membrane will allow air to pass through it when the applied air pressure exceeds the capillary attraction of the fluid to the pore, The relation between the size of a fluid-wet cylindrical pore and the air pressure required to empty it (P, the bubble pressure for that cylindrical pore) is:

$$D = 4\gamma \cos \theta / P$$

where D is the diameter of the pore, $\theta$ is the contact angle, and $\gamma$ is the surface tension of the wetting liquid. When measured bubble pressure can be empirically correlated to the size of real membrane pores it provides readily obtained estimates of the sizes of real, noncylindrical pores. One empirical method used to correlate bubble pressure with the pore sizes of the membranes of this invention is to determine the smallest particles that are retained by the membranes. The membrane are challenged with sub-micron size latex beads and the fraction of beams retained by the membrane are measured. If substantially all (>90%) of the beads are retained by the membrane, the largest pores are smaller than the average diameters of the latex beads. The bubble point of the membrane is measured using a device similar to that described by Dadenhop et al, Membrane Science and Technology, J. E. Flynn, Ed., Plenum Press (1970). The membrane is positioned in the device and wet with IPA. Increasing air pressure is applied to the skin side of the membrane rapidly enough to prevent IPA-induced changes in morphology. Typically the applied pressure starts at 0 psi and reaches 100 psi with 2 minutes of wetting with IPA. The applied pressure sufficient to cause measurable amounts of air flow through the membrane is taken to be the bubble pressure of bubble point, P. In this variation of the bubble point test, P estimates the size of the largest membrane pores.

Thus the largest pores of the membrane described in Example 1 are smaller than about 0.07 u, which corresponds to a bubble pressure (bubble point) of about 72.

EXAMPLE II

This example shows the unexpected change in the properties of the membranes on annealing. Five grams of hydroxylpropyl acrylate (HPA), 1 gram of tetraethylene glycol deacrylate (TEGDA), and 4 grams of Darocure 1173 were added to 91.0 grams of a solution containing 14% poly(vinylidene fluoride) 5% LiCl in DMAc. Portions of the solution were cast separately into films 10 mils thick onto a glass plate. Each film was exposed to ultraviolet light at an intensity of between about 0.2 and 0.6 mw/cm$^2$ (wavelength of maximum emission was 365 mn.) for 15 seconds immediately after casting. The irradiated films were coagulated with various non-solvents, washed, dried, fixed in a frame and annealed as summarized in Table I. Properties of these membranes before and after annealing are also given in Table I.

EXAMPLE III

This example shows that the membranes of the invention are resistant to protein adsorption. Ten grams of HPA, 1 gram of TEGDA, 4 grams of Darocure 1173 initiator were added to 85.0 grams of a solution containing 14% poly(vinylidine fluoride) 5% LiCl in DMAc. The solution was cast in a film 10 mils thick onto a glass plate and immediately exposed to ultraviolet light as in Example II for 2 minutes. The irradiated film was coagulated with a mixture of 1 part acetone and 3 parts water, washed, dried, fixed in a frame and annealed at 130° C. for 30 minutes. The membrane wet completely in less than 30 seconds. It had a flux of 3900 gfd at 25 psi and a bubble point of 66 psi. The protein binding characteristics of the membrane were estimated by the following procedure. Samples of this membrane were soaked in 1% bovine serum albumin (BSA) overnight. Also, samples of nonadsorptive hydrophilic Durapore (TM), and highly adsorptive cellulose esters were soaked in BSA overnight. All unbound albumin was rinsed from the membranes. The samples were then soaked in Ponceau S red dye for 1 hour to color and bind protein, rinsed with 5% acetic acid to remove excess dye, rinsed again with distilled water, and allowed to dry. The amount of protein bound to the membranes was estimated qualitatively from the amount of color left after rinsing and drying. The membrane prepared in this example was visually similar to the nonadsorptive hydrophilic Durapore (TM) membranes in that both membranes were very faintly pink. The high adsorptive cellulose ester membranes were much more intensely colored.

EXAMPLE IV

Ten grams of HPA, 0.6 grams of TEGDA, and 4 grams of Darocure 1173 were added to 84.9 grams of a solution containing 14% poly(vinylidine fluoride) 5% LiCl in DMAc. The solution was cast in a film 10 mils thick onto a glass plate and immediately exposed to ultraviolet light as in Example II for 15 seconds. The irradiated film was coagulated with water, washed, dried, fixed in a frame and annealed at 130° C. for 30 minutes. The membrane wet completely in less than 30 seconds. It had a flux of 1010 gfd at 25 psi and a bubble point of 88 psi.

TABLE I

| | | Effects of Annealing on Membrane Properties | | | | | | |
|---|---|---|---|---|---|---|---|---|
| Sample | Coagulant | Annealing Conditions °C. | Flux Before Annealing | Flux After Annealing | Wetting Time Before Annealing | Wetting Time After Annealing | Bubble Point Before Annealing | Bubble Point After Annealing |
| 1. | (1) | (1) | 650 | 3200 | 1 minute | 1 sec | 71 | 47 |
| 2. | (1) | (2) | 380 | 2300 | phobic | 12 sec | 65 | 76 |
| 3. | (2) | (2) | 2500 | 3620 | phobic | 5 sec | 62 | 54 |

Coagulants-(1) H₂O, (2) NMP: H₂O 1:3
Annl. Conditions-(1) 150°, 30 min.; (2) 130°, 30 min.
Flux is in gallons/foot/day at 25 pounds per square inch.
Bubble point is in pounds per square inch.

We claim:

1. The process for forming a porous membrane having a water wettable surface formed of an interpenetrating polymer network of a semi-crystalline hydrophobic polymer, and a cross-linked hydrophilic second polymer which comprises:
   (a) forming a solution of said hydrophobic polymer, a monomeric composition precursor of said hydrophilic polymer, a crosslinking agent for said monomeric composition and a photoinitiator for said monomer composition,
   (b) casting said solution on a substrate,
   (c) exposing said cast solution to ultraviolet radiation to polymerize and cross-link said monomeric composition,
   (d) coagulating said cast solution,
   (e) removing solvent from said coagulated solution to form a dried porous membrane, and
   (f) annealing said dried porous membrane to render the surface of said membrane water wettable.

2. The process of claim 1 wherein said dried porous membrane is restrained to prevent shrinkage during annealing.

3. The process of any one of claims 1 or 2 wherein said annealing step is conducted at a temperature between about 130° C. and about 160° C. for a time between about 30 minutes and 60 minutes.

4. The process of any one of claims 1 or 2 wherein said hydrophobic polymer is a fluorinated hydrocarbon polymer.

5. The process of any one of claims 1 or 2 wherein said hydrophobic polymer is a polyvinylidene fluoride.

6. The process of any one of claims 1 or 2 wherein said monomeric composition is an hydroxyalkyl acrylate.

7. The process of any one of claims 1 or 2 wherein said porous membrane has a maximum pore size between about 0.01 and 0.1 micron and has an isopropyl alcohol bubble point of between about 40 psi and 140 psi, a water flux of above about 3500 gallons per foot per day at 25 psi for a membrane having a bubble point of about 40 psi, a water flux of above about 1000 gallons per foot per day at 25 psi for a membrane having a bubble point of about 80 psi and a water flux of above about 1000 gallons per foot per day at 25 psi for a membrane having a bubble point of about 140 psi.

* * * * *